G. D. & T. W. PALECHECK.
METHOD OF SCREW THREADING SHEET METAL TUBULAR OBJECTS.
APPLICATION FILED NOV. 6, 1917.
1,271,070.  Patented July 2, 1918.
Fig. 1.
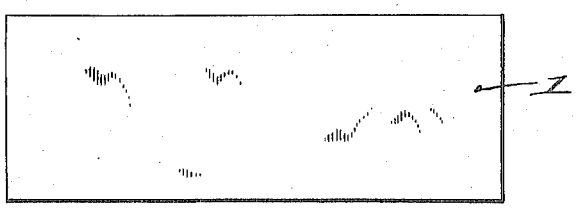
Fig. 2.
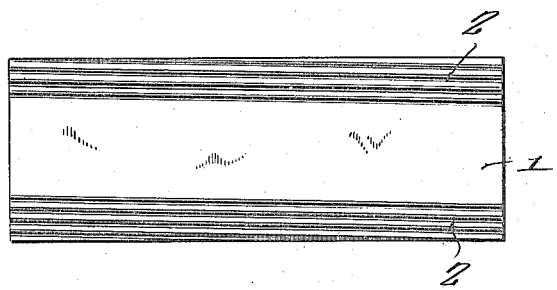
Fig. 4.   Fig. 3.
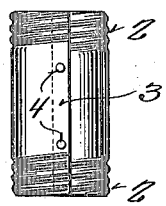   

UNITED STATES PATENT OFFICE.

GEORGE D. PALECHECK AND THEODORE W. PALECHECK, OF MILWAUKEE, WISCONSIN.

METHOD OF SCREW-THREADING SHEET-METAL TUBULAR OBJECTS.

1,271,070.     Specification of Letters Patent.     Patented July 2, 1918.

Application filed November 6, 1917. Serial No. 200,536.

*To all whom it may concern:*

Be it known that we, GEORGE D. PALECHECK and THEODORE W. PALECHECK, citizens of the United States, and residents of Milwaukee, in the county of Milwaukee and State of Wisconsin, have invented certain new and useful Improvements in Methods of Screw-Threading Sheet-Metal Tubular Objects; and we do hereby declare that the following is a full, clear, and exact description thereof.

Our invention refers to new and useful improvements in methods of forming screw threads on tubular objects formed from sheet metal and similar material, such as stove pipes, conduit pipes and mailing tubes.

Heretofore it has been practically impossible to form screw threads on sheet metal tubular objects, or those constructed of similar material, because of the fact that the threading machines will not operate on such objects when they are seamed. In other words, the thickness of the joint or seam in the pipe or similar object interferes with the formation of the threads, which in such objects are in the form of alternate ridges and furrows.

The object of the present invention is therefore to provide means whereby seamed tubular objects may readily be screw-threaded.

In carrying out this object the invention resides in certain novel combination of steps which will be hereinafter more particularly explained and claimed.

The accompanying drawing graphically illustrates the several steps, in which:

Figure 1 is a plan view of a flat sheet of material.

Fig. 2 is a similar view of the same sheet of material after alternate ridges and furrows have been stamped, or pressed, or otherwise formed therein adjacent its opposite edges.

Fig. 3 is an edge view of the sheet shown in Fig. 2, and

Fig. 4 is a side elevational view of a pipe constructed in accordance with our invention.

The principal improvement in the present method of screw threading seamed tubular objects is to construct the corrugations, or the alternate ridges and furrows, which will ultimately form the screw threads, while the material is in a flat sheet. For instance, the numeral 1 designates a flat sheet of metal or other material of appropriate and predetermined size for constructing a tubular object of known dimensions, such as a stove pipe of suitable length and diameter.

This sheet of material is next prepared by corrugating the same from end to end adjacent the opposite edges as shown at 2 to form alternate ridges and furrows which are disposed parallel to each other and at a slight angle to the edges of the sheet, which are preferably parallel to each other and at right angles to the other edges. The inclination of the corrugations provide the requisite pitch for the screw threads. If necessary the corrugations may cover the entire sheet, but when only the ends of the tubular object are to be threaded, these corrugations are merely at the opposite sides of the sheet and adjacent the edges thereof.

The next step is to roll the corrugated sheet in a suitable machine transversely of the ridges and furrows until the opposite ends overlap each other as at 3 in Fig. 4. This will cause the opposite ends of the ridges and furrows to aline with each other to complete the formation of the screw threads.

After this, these overlapped edges may be secured together in any desired manner, either by riveting, as at 4 in Fig. 4, or by crimping. By this arrangement any sheet metal tubular object may be threaded regardless of the thickness of the sheet.

A further advantage of this method is that the flat sheet may be corrugated in any suitable machine and at a very considerable rate of speed. Furthermore, these sheets after being thus prepared may be shipped from the factory to the dealer or distributer in a flat state and formed into a pipe or other tubular object by him. This obviously saves a great amount of space in shipping.

We claim:—

The herein described method of constructing threaded tubular objects from sheets of material which consists in providing a metallic sheet of certain and predetermined length and while the same is in a flat state forming a plurality of alternate parallel ridges and furrows at one side and throughout its entire length, said alternate ridges and furrows extending obliquely of said side edge, rolling said sheet transversely of the alternate ridges and furrows to procure a tubular member, alining the ends of the alternate ridges and furrows, thereafter overlapping the alternate ridges and furrows and the adjacent portion of the sheet, and finally securing the overlapped and alined portions of the sheet together.

In testimony that we claim the foregoing we have hereunto set our hands at Milwaukee, in the county of Milwaukee and State of Wisconsin.

GEORGE D. PALECHECK.
THEODORE W. PALECHECK.